United States Patent Office 3,166,512
Patented Jan. 19, 1965

3,166,512
STABLE, SOLID CHLORINATED CAUSTIC PRODUCT CONTAINING AVAILABLE CHLORINE AND METHOD OF PREPARATION THEREOF
William G. Mizuno, St. Paul, Minn., assignor to Economics Laboratory, Inc., St. Paul, Minn., a corporation of Delaware
No Drawing. Filed Apr. 6, 1961, Ser. No. 101,055
9 Claims. (Cl. 252—99)

This invention relates to stable, solid chlorinated caustic products containing up to about 18% available chlorine and to a method for their preparation. This invention further relates to stable, solid detergent formulations containing the chlorinated caustic products, which detergent formulations are particularly useful in machine dishwashing.

There have been many attempts to obtain a stable, solid chlorinated caustic product having a relatively high available chlorine content by reacting chlorine gas with sodium hydroxide according to the equation $$Cl_2 + 2NaOH \rightarrow H_2O + NaOCl + NaCl$$

The reaction is exothermic and since sodium hydrochlorite decomposes at elevated temperatures of the order of 150° F., reaction temperature control and removal of water of reaction have presented problems.

It has now been found that a stable, solid chlorinated caustic product having an available chlorine content of up to about 18% can be prepared by chlorinating under particular chlorination conditions an admixture of sodium hydroxide with anhydrous hygroscopic complex sodium phosphates, such as sodium pyrophosphate and sodium tripolyphosphate, or sodium metasilicate, or mixtures thereof, in defined proportions.

According to this invention, a finely divided solid reaction mixture containing sodium hydroxide and a hygroscopic material which is an anhydrous complex sodium phosphate, sodium metasilicate, or a mixture thereof, is contacted with a gas stream containing sufficient chlorine to initiate an exothermic reaction at atmospheric or slightly elevated pressures. The weight ratio of caustic to hygroscopic material in the finely divided solid reaction mixture is about 1 to 9:1 respectively, advantageously 1.5 to 4:1. The gas stream containing chlorine is reacted with the solid reaction mixture while maintaining the reaction temperature within the range from about 110° to 140° F., preferably 120° to 130° F., until the available chlorine content of the solid reaction mixture is about 8 to 18%, preferably 14 to 16%. The reaction temperature is then increased to about 135° to 160° F., preferably 140° to 150° F., for a reaction period of at least about 10 minutes but insufficient to decrease the available chlorine content of the solid reaction mixture by more than about 2%. The chlorination reaction is then terminated and the reaction mixture is cooled.

The caustic is advantageously sized to pass about number 10 sieve (U.S. Standard Screen) and the hygroscopic material is advantageously similarly sized. A typical screen analysis is 0% on #10, 20% on #20, 50% on #30, 25% on #40 and 5% on #50. The chlorination reaction appears to take place on the caustic surface and when employing such a sized reaction mixture, a more homogeneous product is obtained.

The anhydrous complex sodium phosphate and/or sodium metasilicate serve to take up water formed and control the chlorination reaction. During the higher temperature portion of the chlorination reaction, they also appear to fuse and/or coalesce with the chlorinated caustic so that a product of unusual stability with respect to available clorine is obtained. In general, the greater the proportion of the hygroscopic material in the solid reaction mixture, the slower will be the rate of chlorination. Hence, weight proportions of caustic to hygroscopic material of less than about 1:1 respectively lead to impracticably slow chlorination rates. In order to obtain products of high available chlorine stability, however, it has been found that weight proportions of caustic to hygroscopic material of greater than about 9:1 respectively cannot be employed. The optimum weight proportion of caustic to hygroscopic material with respect to both chlorination rate and available chlorine stability appears to be about 2.3:1 respectively.

The chlorination reaction temperature can be controlled by employing a chlorination gas stream diluted with air or other inert gas, such as nitrogen, which advantageously has been pre-dried. The proportion of chlorine in the gas stream is at first relatively high to initiate the exothermic chlorination reaction and then is reduced to maintain the reaction temperature at the required level. The reaction temperature can be increased for the higher temperature portion of the reaction by increasing the proportion of chlorine in the gas stream. Advantageously at the completion of the chlorination reaction, cooling is accomplished at least in part by the gas stream in which the proportion of chlorine is relatively low.

The reaction can be carried out in any type of apparatus suitable for gas-solid type reactions. A convenient apparatus is a conventional drum-dryer containing internal baffles and equipped with heat removal means, for example, means for spray cooling, or internal or external cooling coils for removing the exothermic heat of reaction, and means for introducing and recovering and recycling the chlorine. The apparatus employed, however, should provide for intimate mixture of the gases and solids and, in addition, should provide for agitation of the solids throughout the reaction and subsequent cooling such that agglomeration does not occur and the solid reaction mixture is at all times maintained in the form of finely divided discrete particles.

The process of this invention is illustrated in detail by the following examples. The apparatus employed in Examples 1 to 8 was a rotating drum 23 inches in diameter and 35 inches long equipped with internal baffles, a gas inlet at one end connected with a perforated tube as an axis and a gas vent at the other end. The drum rotated at about 15–20 r.p.m. The drum was wrapped with cloth and means were provided for spraying the cloth with water and for subjecting the cloth to a forced air draft to effect cooling by evaporation.

EXAMPLE 1

Into the drum were charged 35 pounds of sodium hydroxide in the form of ground flakes and 15 pounds of anhydrous technical grade high temperature-rise beaded sodium tripolyphosphate. The U.S. Standard Screen analysis of the reactants was as follows:

| Sodium Hydroxide | | Sodium Tripolyphosphate | |
|---|---|---|---|
| Screen | Percent On | Screen | Percent On |
| 10 | 0 | 20 | 0.2 |
| 20 | 20 | 30 | 15.8 |
| 30 | 50 | 50 | 55.9 |
| 40 | 25 | 60 | 10.4 |
| 50 | 5 | 80 | 9.9 |
| | | 100 | 3.7 |
| | | Pan | 4.1 |

Rotation was started and chlorine gas was introduced from a cylinder into the drum at the rate of 20 liters per minute (measured at 20° C.). In about 15 minutes, the temperature of the reaction mixture had risen to about 110° F. and the introduction of dry air into the chlorine gas stream was begun. The amount of air introduced was varied between 0 to 3 liters per minute (measured at 20° C.) and the amount of chlorine introduced was varied between 15 and 20 liters per minute (measured at 20° C.). Variation of the gas stream composition and flow rate together with the wet cloth wrapping maintained the temperature of the reaction mixture at about 120°–130° F. After about two hours, samples of the solid reaction mixture were taken periodically and titrated for available chlorine. At the end of about 4 hours the available chlorine content of the solid reaction mixture was 15%. The air flow to the drum and the forced air draft to the drum wrapping were cut off and the chlorine feed rate was increased for the higher temperature portion of the reaction. The temperature rose to 140° F. in a few minutes and was maintained at 140°–145° F. for 15 minutes. The solid reaction mixture appeared slightly damp and began to sinter. At the end of the 15 minute period, the chlorine flow was reduced to 1 liter per minute, the air flow was set at 2 liters per minute, and the forced air draft to the drum wrapper was turned on in order to cool the solid reaction mixture to about 80–90° F. The gas stream was then cut off, the drum stopped and the product removed.

A total of 13 pounds of chlorine was introduced into the drum during the reaction and about 3 to 4 pounds reacted. The bulk of the final product had increased 75 to 100% during the reaction. The product was still relatively finely divided, however, about 50% passing through a 20 mesh screen. The available chlorine content of the final product was about 14%.

The pertinent data from this and other runs are shown in the following Table I.

(measured at 20° C.) and the amount of chlorine introduced was varied between 1 to 3 liters per minute (measured at 20° C.). Variation of the gas stream composition and flow rate together with the water spray on the drum maintained the temperature of the reaction mixture at about 115° to 135° F. These conditions were maintained for two hours at the end of which period the air flow and the chlorine flow rate were adjusted to provide a reaction mixture temperature of about 140° F. for an additional period of 30 minutes. The reaction mixture was then cooled with an air stream containing a small amount of chlorine. The final available chlorine content of the reaction mixture was 16.5%.

EXAMPLE 10

Into the laboratory size drum were placed 240 grams of sodium hydroxide in the form of ground flakes with a screen analysis as in Example 1 and 60 grams of anhydrous technical grade sodium metasilicate having the following U.S. Standard Screen analysis:

| Screen: | Percent on |
|---|---|
| 20 | 0.2 |
| 30 | 0.3 |
| 50 | 7.6 |
| 60 | 10.5 |
| 80 | 20.7 |
| 100 | 14.3 |
| Pan | 46.4 |

The reaction was carried out in essentially the same manner as described in Example 9, the pertinent data appearing in Table II following.

EXAMPLE 11

Into the laboratory size drum were placed 225 grams

*Table I*

| Example No. | Chlorine Rate, l./min. | Air Rate, l./min. | Initial Reaction Temperature, °F. | Initial Reaction Time, hours | Final Reaction Temperature, °F. | Final Reaction Time, Min. | Final Available Chlorine, Percent |
|---|---|---|---|---|---|---|---|
| 1 | 15–20 | 0–3 | 120–130 | 4 | 140–145 | 15 | 15 |
| 2 | 10–15 | 0–5 | 110–120 | 3½ | 140–150 | 20 | 14.4 |
| 3 | 10–18 | 0–3 | 115–120 | 3¼ | 135–145 | 25 | 11.25 |
| 4 | 12–20 | 2–5 | 115–125 | 3 | 135–145 | 15 | 12.45 |
| 5 | 12–18 | 0–3 | 120–125 | 2½ | 145–152 | 10 | 14.87 |
| 6 | 10–18 | 0–3 | 115–125 | 3 | 135–145 | 15 | 14.4 |
| 7 | 12–20 | 0–5 | 115–120 | 3½ | 140–145 | 15 | 14.95 |
| 8 | 10–18 | 0–5 | 115–125 | 4½ | 140–148 | 20 | 14.4 |

Additional experiments were carried out in a laboratory size apparatus which included a Plexiglas drum about six inches in a diameter and a foot long rotating at a speed of about 20 to 30 r.p.m. The axle upon which the drum rotated was perforated and open at one end for introduction of chlorine and air. The drum was cooled by a spray of water directed on its top and collected in a tray below.

EXAMPLE 9

Into the drum were placed 240 grams of sodium hydroxide in the form of ground flakes with a screen analysis as in Example 1 and 60 grams of sodium tripolyphosphate (anhydrous) with a screen analysis as in Example 1. Rotation was started and chlorine gas from a cylinder was introduced into the drum at the rate of 3 liters per minute (measured at 20° C.). In about 10 minutes the temperature of the reaction mixture had risen to about 115° F. and the introduction of dry air into the chlorine gas stream was begun. The amount of air introduced was varied between 0 to 3 liters per minute of sodium hydroxide in the form of ground flakes with a screen analysis as in Example 1, 37.5 grams anhydrous technical grade powdered sodium pyrophosphate and 37.5 grams anhydrous technical grade granular sodium pyrophosphate having the following U.S. Standard Screen analysis:

| Screen | Powdered, percent on | Granular, percent on |
|---|---|---|
| 20 | 0 | Trace |
| 30 | Trace | 0.2 |
| 50 | 0.1 | 75.1 |
| 60 | 0.1 | 12.4 |
| 80 | 24.6 | 9.3 |
| 100 | 32.1 | 1.8 |
| Pan | 43.1 | 1.2 |

The reaction was carried out in essentially the same manner as described in Example 10, the pertinent data appearing in Table II following.

Table II

| Example | Hygroscopic Agent | Chlorine Rate, Liters/Min. | Air Rate, Liters/Min. | Initial Rxn. Temp., °F. | Initial Rxn. Time, Hrs. | Final Rxn. Temp., °F. | Final Rxn. Time, Min. | Final Percent Av. Cl. |
|---|---|---|---|---|---|---|---|---|
| 9 | Sodium Tripolyphosphate | 1-3 | 0-3 | 115-135 | 2 | 140 | 30 | 16.5 |
| 10 | Sodium Metasilicate | 1-3 | 0-3 | 120-130 | 1¾ | 140-150 | 25 | 15.8 |
| 11 | Sodium Pyrophosphate | 1-3 | 0-3 | 120-130 | 1½ | 135 | 25 | 16.5 |

Storage stability tests were performed with certain of the products shown in Table I. In these tests, the available chlorine content of the product was determined immediately prior to the test, about 10 gram samples of the product were placed in small clear glass bottles closed with a screw cap, and the bottles stored in a dark storage cabinet. At the conclusion of the test, the bottle was removed from the storage cabinet and its available chlorine content was again determined. A portion of the product of Example 7 was first screened on a No. 20 mesh screen. The particles remaining on the screen were designated 7A and those passing through the screen were designated 7B. The pertinent data appear in Table III below.

Table III

| Example Number | Time of Storage at Room Temp., Days | Initial Chlorine | Final Chlorine, percent | Percent Loss |
|---|---|---|---|---|
| 2 | 37 | 13.6 | 12.9 | 4 |
| 3 | 34 | 11.25 | 11.2 | 0.4 |
| 7A | 53 | 14.6 | 14.5 | 0.7 |
| 7B | 53 | 16.4 | 16.4 | 0.0 |
| 7A | 75 | 14.6 | 14.4 | 1.4 |
| 7B | 75 | 16.4 | 15.8 | 3.7 |
| 6 | 211 | 14.4 | 13.9 | 3.5 |
| 7 | 210 | 14.95 | 14.3 | 4.3 |
| 9 | | 16.5 | | |
| 10 | 106 | 15.8 | 6.58 | 58.3 |
| 11 | 110 | 16.5 | 8.05 | 48.8 |

As shown in Table III, the stability of the products made in the laboratory reactor are not as stable as those made in the larger pilot plant reactor employed in Examples 1-8 apparently because of inadequate tumbling action during the second reaction sintering stage.

Another aspect of this invention relates to stable solid, detergent formulations containing the chlorinated caustic product, which formulations are of particular value in machine dishwashing.

Machine dishwashing is used in connection with practically all commercial and institutional dining facilities as well as in a rapidly increasing proportion of private homes. It has been the practice in formulating machine dishwashing detergents to use in the main various combinations of inorganic sodium and potassium salts, such as polyphosphates, silicates, carbonates and basic materials such as sodium and potassium hydroxides. It has been recognized that detergency would be enhanced and that germicidal and destaining properties would be imparted to detergent formulations by incorporation therein of available chlorine containing solid components. Thus, formulations containing chlorinated trisodium phosphate and trichlorocyanuric acid have been prepared and have proven entirely satisfactory for some purposes.

Chlorinated trisodium phosphate must, however, be formulated with hydrated salts for best stability and since it contains only about 3.5% available chlorine, formulation flexibility is reduced. In addition, the orthophosphate present when chlorinated trisodium phosphate is employed in machine dishwashing formulations tends to film glassware. Also, trichlorocyanuric acid containing detergents, when used in machine dishwashing formulations, releases gaseous chlorine in conventional detergent reservoirs and this is objectionable in some instances. More important, however, for heavy duty formulations, i.e., those requiring caustic, the presently available chlorinated solids cannot be employed because they are not compatible with the alkali metal hydroxides.

The chlorinated caustic products of this invention, on the other hand, can be formulated with anhydrous salts, giving a more concentrated finished product, provide increased formulation flexibility due to their high available chlorine content, and are compatible with the alkali metal hydroxides.

Advantageously, the detergent formulations of this invention contain sufficient chlorinated caustic to provide from about 0.5 to 8% available chlorine in the finished composition. In addition to the chlorinated caustic, which imparts germicidal and destaining properties, the detergent compositions of this invention contain alkaline salts which are conventionally employed to perform three essential functions: (1) condition the water so that the detersive action can take place more effectively; (2) remove the soil from the dishes thoroughly, completely and rapidly; and (3) leave the dish surface in a state where the water drains in a continuous film without breaking into little hanging drops or streams and without leaving objectionable residues. Many of the alkaline salts act as both water conditioners and soil removers but will be discussed on the basis of their primary function.

Sodium carbonate, although it is among the least effective water-conditioning agents, together with its sesquicarbonate, is almost universally used as a component in dishwashing compounds, because of its low cost. The detergent compositions of this invention can contain from 0 to 50% by weight of sodium or potassium carbonate.

The best and most efficient water-softening ingredients are the condensed polyphosphates, including the tripolyphosphates and the pyrophosphates. The detergent compositions of this invention can contain from 10 to 60% by weight sodium or potassium polyphosphates. Other sequestering agents, including organic materials such as ethylenediamine-tetracetic acid and alkali metal gluconates such as sodium gluconate, can also be employed in compositions of this invention, particularly in formulations for dairy use containing high percentages of caustic.

Polyphosphates have been shown to promote corrosion of certain metal parts of dishwashing machines but this corrosive effect can be overcome by including a relatively large proportion of a silicate in the composition. In this connection, metasilicate is important, not only from the standpoint of the machine itself, but also from the standpoint of the utensils washed. For instance, regardless of whether polyphosphate is present in a solution or not, highly alkaline dishwashing detergents containing no silicates can attack, etch, and darken aluminum utensils. Some of these formulations also have a destructive action on the over-the-glaze dish patterns. Suitable proportions of silicates in the formulation help overcome these difficulties.

The soil-removing ingredients commonly employed in dishwashing compounds include borates and carbonates, which are relatively ineffective, and orthophosphates and metasilicates, both of which are highly effective. The detergent compositions of this invention can include 0 to 50% by weight of trisodium or tripotassium phosphate and 0 to 50% by weight of sodium or potassium metasilicate.

More recently small amounts of synthetic organic surfactants or wetting agents have been incorporated into machine dishwashing formulations to promote smooth drainage drying, i.e., to prevent water break. Some formulations include from 1% to 5% or more of a low foaming, polyalkenoxy type nonionic surfactant. The detergent compositions of this invention can include 1 to 5% by weight of such synthetic, organic, low foaming polyalkenoxy type nonionic surfactants.

Some industrial detergents as well as conventional machine dishwashing compositions employed for glass and bottle washing normally contain caustic soda as the major cleansing ingredient. Alkalies tend to attack glass surfaces but this can be inhibited by zincates, beryllates, or aluminates. As stated above, sodium gluconate and ethylene diaminetetracetic acid can be used as sequestering agents for high caustic content solutions. The detergent compositions of this invention can include 0–97% sodium or potassium hydroxide.

Hence, the detergent compositions of this invention contain sufficient chlorinated caustic to provide at least about 0.5% available chlorine and as the principal detersive agent widely varying proportions of sodium or potassium polyphosphates, i.e., 10 to 60%; sodium or potassium silicates, i.e., 0 to 50%; sodium or potassium carbonates, i.e., 0 to 50%, sodium or potassium hydroxides, i.e., 0 to 97%; and trisodium or tripotassium phosphate, i.e., 0 to 50%. The amount of chlorinated caustic product ordinarily constitutes about 3 to 75% by weight of the final detergent composition, and for machine dishwashing formulations, the chlorinated caustic product ordinarily constitutes 10 to 50% by weight of the final formulation.

Representative detergent compositions of this invention are shown in the following Table III. These formulations were prepared in duplicate using in the first instance the product of Example 7 which was retained on a 20 mesh screen (designated A) and in the second instance the product of Example 7 which passed through a 20 mesh screen (designated B). Examples 12 through 19 are suitable institutional type machine dishwashing detergents and Examples 20 through 24 are suitable glass dish processing compounds for periodic use to remove tenacious stains and food soils which tend to build up under many conditions when ordinary detergents are used.

Storage stability tests were performed with the formulations shown in Table IV. In these tests, about 10 gram samples of the formulations were placed in small, clear glass bottles closed with screw caps and the bottles were placed in a dark storage cabinet. A number of such samples of each formulation were made up and the entire 10 gram sample used in the assay. The results appear in Table V below.

From these data it can be seen that formulations made from the larger particles were somewhat more stable with respect to loss of available chlorine. Also, it appears that dense soda ash decreases the stability of the product when present in high proportions.

Table V

| Days Storage at Room Temp. | 11 | 20 | 25 | 32 | 40 | 46 | 53 | 60 | 67 | 75 |
|---|---|---|---|---|---|---|---|---|---|---|
| Example No. | Percent Available Chlorine Remaining ||||||||||
| 12A | | 63 | | 65 | | 55 | | 54 | | 29 |
| 12B | 7 | | 5 | | 29 | | 7 | | 5 | |
| 13A | | 100 | | 90 | | 86 | | 85 | | 80 |
| 13B | 84 | | 88 | | 82 | | 84 | | 75 | |
| 14A | | 92 | | 88 | | 90 | | 87 | | 62 |
| 14B | 85 | | | | 81 | | 74 | | 63 | |
| 15A | | 100 | | 100 | | 100 | | 100 | | 92 |
| 15B | 95 | | 95 | | 93 | | 90 | | 87 | |
| 16A | | 96 | | 98 | | 96 | | 96 | | 94 |
| 16B | 93 | | 94 | | 92 | | 87 | | 87 | |
| 17A | | 94 | | 99 | | 98 | | 92 | | 92 |
| 17B | 95 | | 93 | | 91 | | 89 | | 86 | |
| 18A | | 95 | | 96 | | 92 | | 92 | | 87 |
| 18B | 92 | | 85 | | 86 | | 84 | | 80 | |
| 19A | | 100 | | 88 | | 77 | | 80 | | 79 |
| 19B | 90 | | 89 | | 82 | | 84 | | 71 | |
| 20A | | 100 | | 100 | | 95 | | 83 | | 75 |
| 20B | 93 | | 75 | | 82 | | 49 | | 50 | |
| 21A | | 100 | | 100 | | 95 | | 88 | | 84 |
| 21B | 94 | | 91 | | 84 | | 78 | | 68 | |
| 22A | | 100 | | 100 | | 95 | | 93 | | 85 |
| 22B | 95 | | 89 | | 89 | | 88 | | 55 | |
| 23A | | 96 | | 95 | | 91 | | 86 | | 77 |
| 23B | 89 | | 81 | | 59 | | 30 | | 45 | |
| 24A | | 100 | | 98 | | 64 | | 94 | | 85 |
| 24B | 91 | | 89 | | 2 | | 73 | | 59 | |

The formulations shown in Table IV were made up with a product of this invention derived from sodium tripolyphosphate as the hygroscopic material, i.e., the product of Example 7. Products of this invention derived from other complex sodium phosphates, such as the sodium pyrophosphate of Example 11, or mixtures of complex sodium phosphates, can be substituted for the product of Example 7 in any of the formulations of Table IV in the same amount or in amounts generally described elsewhere in the specification.

Where the products of this invention are derived from sodium metasilicate, such as in Example 10, the formulations shown in Table IV are altered correspondingly with respect to complex sodium complex phosphate and sodium metasilicate content. Typical formulations wherein a product of this invention derived from sodium metasilicate Table IV

| Ingredients, percent by weight | Example Number |||||||||||||
|---|---|---|---|---|---|---|---|---|---|---|---|---|---|
| | 12 | 13 | 14 | 15 | 16 | 17 | 18 | 19 | 20 | 21 | 22 | 23 | 24 |
| Product of Example 7 (A and B) | 16 | 16 | 20 | 20 | 25 | 25 | 16 | 20 | 30 | 30 | 40 | 40 | 40 |
| Sodium Tripolyphosphate | 17 | 17 | 17 | 35 | 20 | 20 | 50 | 30 | 50 | 50 | 60 | 40 | 40 |
| Sodium Metasilicate | | | | 20 | 25 | | 24 | | 20 | | | | 20 |
| Sodium Hydroxide | 10 | 10 | 15 | 10 | 15 | 15 | 10 | 10 | | 10 | | | |
| Dense Soda Ash | 44 | | 35 | | | 25 | | 40 | | 10 | | 20 | |
| Sodium Pyrophosphate | 13 | 13 | 13 | | 15 | 15 | | | | | | | |
| Sodium Sulfate (anhydrous) | | 44 | | 15 | | | | | | | | | |

Table VI

| Ingredients, percent by weight | Example Number ||||
|---|---|---|---|---|
| | 25 | 26 | 27 | 28 |
| Product of Example 10 | 16 | 15 | 10 | 20 |
| Sodium Tripolyphosphate | 49 | 22 | 50 | 51 |
| Sodium Metasilicate | 35 | | 30 | 24 |
| Sodium Hydroxide | | 15 | 10 | 5 |
| Soda Ash | | 35 | | |
| Sodium Pyrophosphate | | 13 | | |

I claim:
1. A method for producing a stable, solid chlorinated caustic product containing up to about 18% available chlorine which comprises intimately contacting a finely divided solid reaction mixture consisting essentially of sodium hydroxide and at least one hygroscopic material selected from the class consisting of sodium pyrophosphate, sodium tripolyphosphate and sodium metasilicate, the weight ratio of sodium hydroxide to hygroscopic material being about 1 to 9:1, with a gas stream containing sufficient chlorine to initiate an exothermic reaction, reacting the gas stream with the solid reaction mixture while maintaining a reaction temperature within the range from about 110° to 140° F. until the available chlorine content of the solid reaction mixture is about 8 to 18%, increasing the reaction temperature to about 135° to 160° F., maintaining the reaction temperature within the range from about 135° to 160° F. for a reaction period of at least about 10 minutes but insufficient to decrease the available chlorine content of the solid reaction mixture by more than about 2%, and cooling the solid reaction mixture, the finely divided solid reaction mixture being agitated throughout the reaction and subsequent cooling such that agglomeration does not occur.

2. A method for producing a stable, solid chlorinated caustic product containing up to about 18% available chlorine which comprises intimately contacting a finely divided solid reaction mixture consisting essentially of sodium hydroxide and sodium tripolyphosphate in a weight ratio of about 1.5 to 4:1 with a gas stream containing sufficient chlorine to initiate an exothermic reaction, reacting the gas stream with the solid reaction mixture while maintaining a reaction temperature within the range from about 120° to 130° F. until the available chlorine content of the solid reaction mixture is about 8 to 18%, increasing the reaction temperature to about 140° to 150° F., maintaining the reaction temperature within the range from about 140° to 150° F. for a reaction period of at least about 10 minutes but insufficient to decrease the available chlorine content of the solid reaction mixture by more than about 2%, and cooling the solid reaction mixture, the finely divided solid reaction mixture being agitated throughout the reaction and subsequent cooling such that agglomeration does not occur.

3. A method for producing a stable, solid chlorinated caustic product containing up to about 18% available chlorine which comprises intimately contacting a finely divided solid reaction mixture consisting essentially of sodium hydroxide and sodium metasilicate in a weight ratio of about 1.5 to 4:1 with a gas stream containing sufficient chlorine to initiate an exothermic reaction, reacting the gas stream with the solid reaction mixture while maintaining a reaction temperature within the range from about 120° to 130° F. until the available chlorine content of the solid reaction mixture is about 8 to 18%, increasing the reaction temperature to about 140° to 150° F., maintaining the reaction temperature within the range from about 140° to 150° F. for a reaction period of at least about 10 minutes but insufficient to decrease the available chlorine content of the solid reaction mixture by more than about 2%, and cooling the solid reaction mixture, the finely divided solid reaction mixture being agitated throughout the reaction and subsequent cooling such that agglomeration does not occur.

4. The product produced by the process of claim 1.

5. The product produced by the process of claim 2.

6. A detergent composition consisting essentially of as the principal detersive agent an inorganic alkali metal detergent salt and sufficient to provide an available chlorine content of about 0.5% to 8% of the product of claim 1.

7. A machine dishwashing composition consisting essentially of at least one detergent salt wherein the cation is selected from the class consisting of sodium and potassium and the anion is selected from the class consisting of bicarbonate, carbonate, polyphosphate, orthophosphate, orthosilicate, metasilicate and hydroxide, and sufficient to provide an available chlorine content of about 0.5 to 8% of the product of claim 1.

8. A detergent composition consisting essentially of by weight 10 to 60% sodium polyphosphate, 0–50% sodium carbonate, 0–50% sodium metasilicate, 0–50% trisodium phosphate and 3–75% of the product of claim 2.

9. A machine dishwashing composition consisting essentially of by weight 10 to 60% sodium tripolyphosphate, 0–50% sodium carbonate, 0–50% sodium metasilicate, 0–50% trisodium phosphate and 10–50% of the product of claim 2.

References Cited in the file of this patent

UNITED STATES PATENTS

| | | |
|---|---|---|
| 1,522,561 | Weber | Jan. 13, 1925 |
| 1,989,759 | Logue et al. | Feb. 5, 1935 |
| 2,034,361 | Sutton | Mar. 17, 1936 |
| 2,756,214 | Albrecht | July 24, 1956 |
| 2,895,916 | Milenkevich et al. | July 21, 1959 |